United States Patent
Khemet et al.

(10) Patent No.: US 7,513,164 B1
(45) Date of Patent: Apr. 7, 2009

(54) SINGLE DIAPHRAGM ATF DIFFERENTIAL PRESSURE TRANSDUCER

(75) Inventors: Bomani Khemet, Columbus, OH (US); Lamar F. Ricks, Lewis Center, OH (US); William S. Hoover, Plain City, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/958,828

(22) Filed: Dec. 18, 2007

(51) Int. Cl.
*G01L 7/00* (2006.01)
(52) U.S. Cl. .......................................... 73/756; 73/706
(58) Field of Classification Search ................... 73/756, 73/700, 706
See application file for complete search history.

(56) References Cited

U.S. PATENT DOCUMENTS

| | | | |
|---|---|---|---|
| 4,794,048 A * | 12/1988 | Oboodi et al. .............. | 428/432 |
| 6,945,118 B2 * | 9/2005 | Maitland et al. .............. | 73/754 |
| 7,266,999 B2 * | 9/2007 | Ricks .......................... | 73/146.5 |
| 7,360,438 B2 * | 4/2008 | Gaines ......................... | 73/774 |
| 2005/0150303 A1 * | 7/2005 | Maitland et al. .............. | 73/754 |
| 2007/0075824 A1 * | 4/2007 | Kosht et al. .................. | 338/162 |

* cited by examiner

*Primary Examiner*—Andre J Allen
(74) *Attorney, Agent, or Firm*—Richard H. Krukar; Kermit D. Lopez; Luis M. Ortiz (57) ABSTRACT

An advanced thick film (ATF) pressure transducer can be produced from an advanced thick film stack on a metallic substrate. The metallic substrate has a flexible metallic diaphragm that flexes when there is a pressure differential across its top and bottom surfaces. The conductive and dielectric layers of the ATF stack are patterned into wire networks and bond pads. A strain sensor can be attached to bond pads or can be formed as part of an ATF layer. Flexure of the diaphragm stresses the strain sensor to produce an output proportional to the pressure differential. The ATF pressure transducer can be packaged into a housing that provides easy deployment and electrical interconnectivity.

20 Claims, 6 Drawing Sheets

SINGLE DIAPHRAGM ATF DIFFERENTIAL PRESSURE TRANSDUCER

TECHNICAL FIELD

Embodiments relate to pressure transducers, electrical circuits, thin films, and thin film processing. Embodiments also relate to packaging, chip packaging, and sensor packaging.

BACKGROUND OF THE INVENTION

Pressure transducers can measure the pressure differential between two adjacent volumes. The volumes can contain a fluid, such as a liquid or gas, with each volume's fluid having a pressure. The pressure differential is the difference in pressure between the fluids in the adjacent volumes. Current pressure transducers often employ one or more silicon strain sensors in proximity to a silicon diaphragm. The diaphragm separates the two volumes and the pressure differential causes the diaphragm to flex. The flexure can be sensed as strain by the strain sensors and interpreted as a measurement of the pressure differential. The fluid pressure in one of the volumes can be set to a known quantity such that the measurement can be interpreted as an absolute pressure measurement.

Many fluids can dissolve, corrode, or otherwise interact with silicon and it's corresponding die attach adhesive and/or bonding agent. Special precautions must be taken to prevent such fluids from contacting the silicon strain sensors or silicon diaphragm. As such, these systems are limited. Systems and methods sensing pressure in harsh environments are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments that an advanced thick film stack overlies a metal substrate. The metal substrate is a flexible diaphragm. The advanced thick film has a number of layers including an overglaze layer, a component layer, a conductor layer and at least one dielectric layer. The dielectric layer is electrically insulating and thereby can prevent an electrical current from flowing between the metallic substrate and the conductor layer.

The conductor layer is made of wire networks. The wire networks conduct electricity between electrical components and bonding pads. Bonding pads provide for external circuits, cabling, or wiring to be attached to the conductor layer. The electrical components can include resistors in the component layer. Resistors can be produced by screen printing, by a deposition and etch process, or by attaching components. The component layer can also contain other components such as transistors.

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION

The particular values and configurations discussed in these non-limiting examples can be varied and are cited merely to illustrate at least one embodiment and are not intended to limit the scope thereof. In general, the figures are not to scale.

Figure 1:
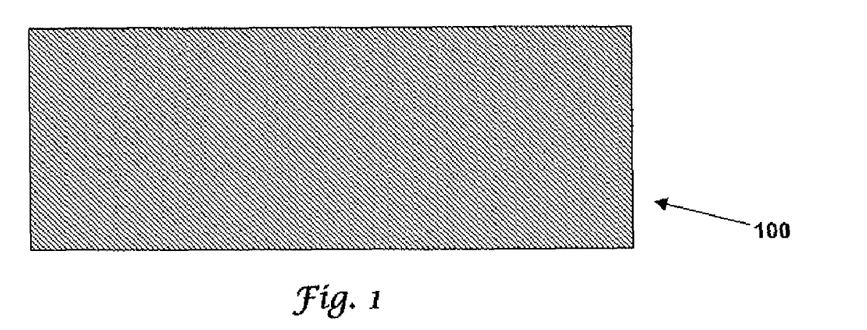
FIG. 1 illustrates a metal substrate in accordance with aspects of the embodiments.

FIG. 1 illustrates a metallic substrate 100 in accordance with aspects of the embodiments. The metallic substrate is a metallic diaphragm that is thin enough to flex when subjected to a pressure differential. Metallic substrates can be formed from a number of materials such as Hastelloy C22 CW, Hastelloy C22, Haynes-214, Inconel 718, A 286, Kanthal-A, Kanthal-D, or 430 Stainless Steel, many of which are alloys. Those practiced in the arts of metallurgy or advanced thick film processing are familiar with Hastelloy C22 CW, Hastelloy C22, Haynes-214, Inconel 718, A 286, Kanthal-A, Kanthal-D, and 430 Stainless Steel.

Figure 2:
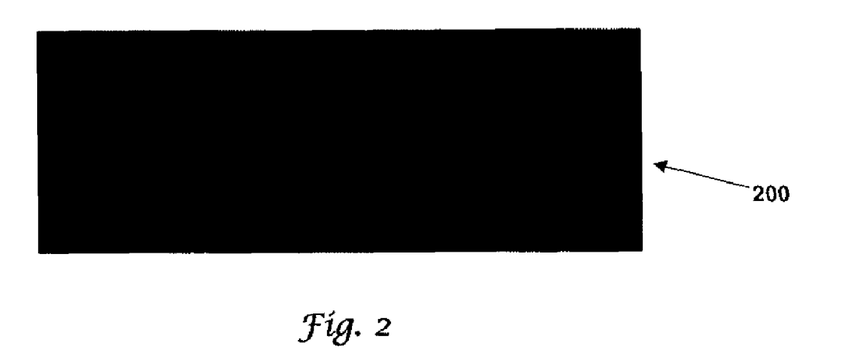
FIG. 2 illustrates a dielectric layer in accordance with aspects of the embodiments.

FIG. 2 illustrates a dielectric layer 200 in accordance with aspects of the embodiments. An ATF stack can have a single dielectric layer or can have many dielectric layers. The dielectric layers can be deposited on the metallic substrate using a number of techniques such as printing, evaporative deposition, chemical deposition, or lamination. Heraeus SD 2000 and Honeywell Z2Zr are examples of dielectric materials that can be used as dielectric layers. Heraeus SD 2000 and Honeywell Z2Zr are known to those practiced in the arts of dielectrics or ATF processing.

Figure 3:
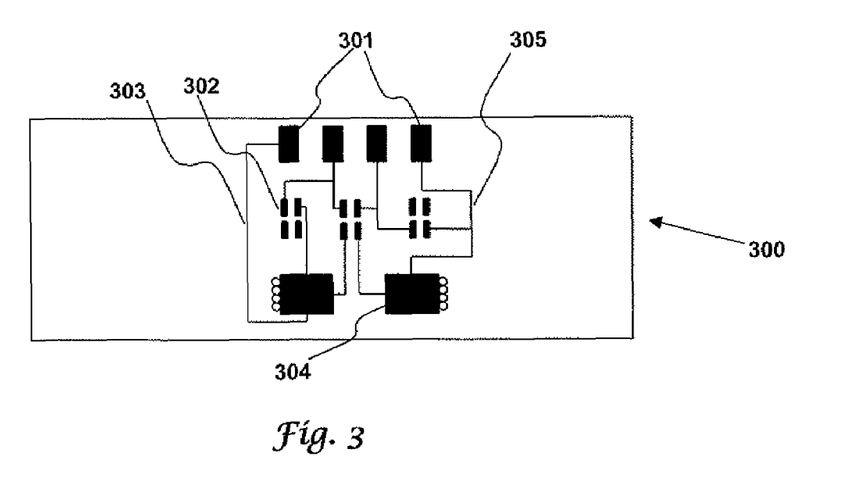
FIG. 3 illustrates a conductor layer in accordance with aspects of the embodiments.

FIG. 3 illustrates a conductor layer 300 in accordance with aspects of the embodiments. The conductor layer has bond pads 301 and a wire pattern made of a number of wire networks 303, 305. The wire networks 303,305 have component pads 302 for components such as resistors, transistors, and capacitors. The wire networks also have sensor pads 304.

Figure 4:
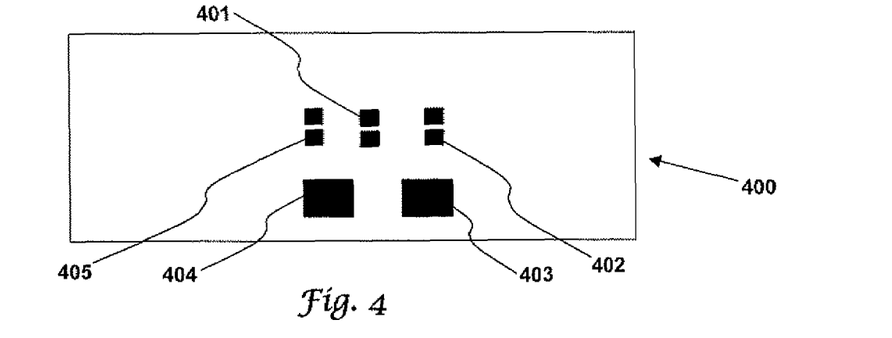
FIG. 4 illustrates a component layer in accordance with aspects of the embodiments.

FIG. 4 illustrates a component layer in accordance with aspects of the embodiments. The components can include resistors 405, transistors 401, capacitors 402, and sensors 403, 404. Resistors can be printed directly over the conductor layer, can be attached by a conductive adhesive or solder, or can be produced by a lithographic process. Many resistors are sensitive to stress such that the resistor's conductance changes when the resistor is flexed. Resistors printed directly onto the conductor layer can be particularly sensitive to flex induced stress and can thereby be used as strain sensors. The resistors can be arranged and electrically connected by the wire networks to form a Wheatstone bridge. Those familiar with electric circuits are familiar with using Wheatstone bridges to detect small changes in resistance.

Figure 5:
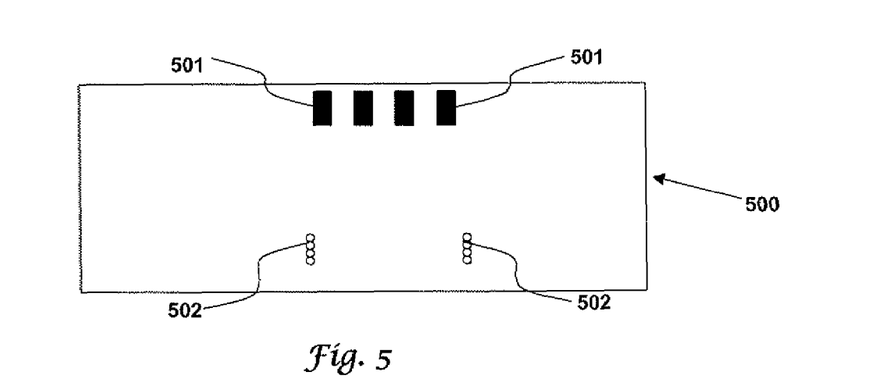
FIG. 5 illustrates a an overglaze layer in accordance with aspects of the embodiments.

FIG. 5 illustrates an overglaze layer 500 in accordance with aspects of the embodiments. The overglaze layer 500 protects the other layers from the environment. Holes 501, 502 in the overglaze layer 500 can provide access to the conductor layer or the component layer. For example, external circuits can be attached to the bond pads through holes 501 in the overglaze layer 500.

Figure 6:
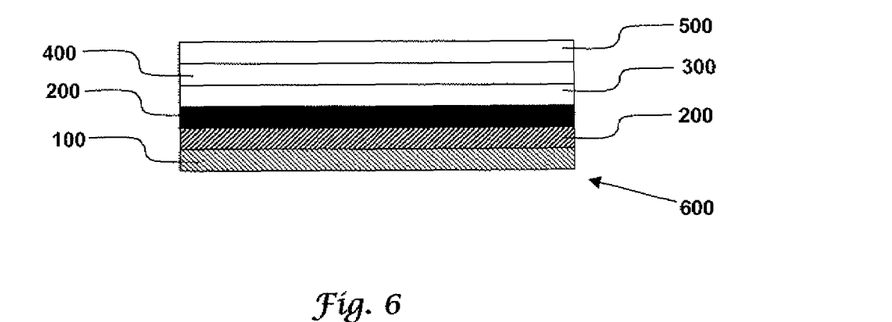
FIG. 6 illustrates an advanced thick film (ATF) stack in accordance with aspects of the embodiments.

FIG. 6 illustrates an ATF stack 600 in accordance with aspects of the embodiments. The lowest layer is the metallic substrate 100. Two dielectric layers 200 are on top of the metallic substrate 100. Two dielectric layers 200 are shown for illustration purposes only because one or more dielectric layers can be used. A conductor layer 300 is on top of the dielectric layers 200. A component layer 400 is on top of the conductor layer 300. Finally, an overglaze layer 500 overlies all the other layers.

An ATF stack can be used as an ATF differential pressure transducer because the ATF stack is thin enough to flex when subjected to a pressure differential and because the components, such as printed on resistors, are strain sensors that are sensitive to the flexure.

Figure 7:
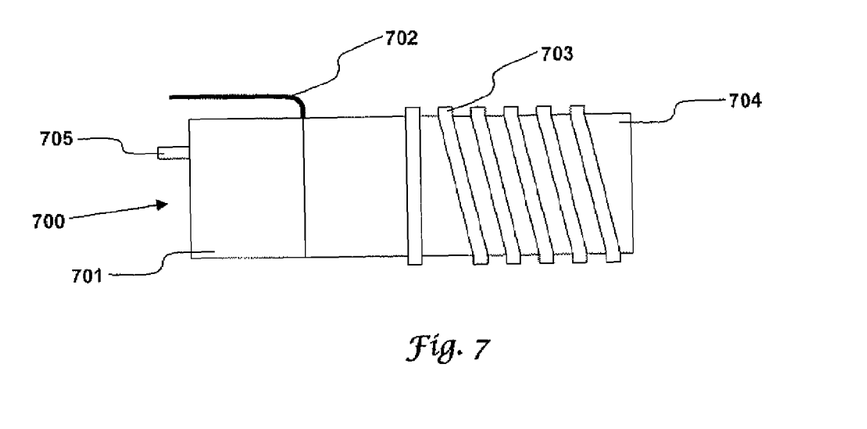
FIG. 7 illustrates a ATF differential pressure transducer package in accordance with aspects of the embodiments.

FIG. 7 illustrates a ATF differential pressure transducer package in accordance with aspects of the embodiments. A housing 700 has a cap end 701 and an attachment end 704. The cap end 701 has a port 705 through which a fluid can reach an ATF differential pressure transducer inside the housing. The attachment end 704 has threads 703 such that the housing can be screwed into a fixture. A wiring cable 702 is shown exiting the housing between the cap end 701 and the attachment end 704. The wiring cable is a group of wires that can be attached to the bond pads. Many embodiments do not have the wiring cable 702 because, in those embodiments, external circuits access the ATF differential pressure transducer through pins in the attachment end 704.

Figure 8:
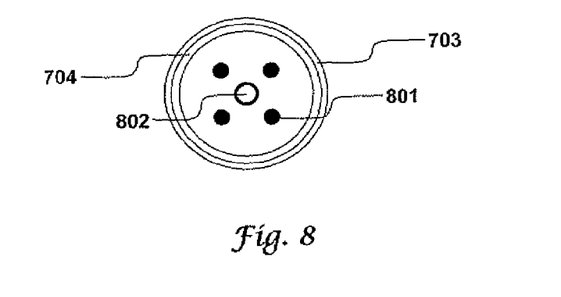
FIG. 8 illustrates an end view of a ATF differential pressure transducer package in accordance with aspects of the embodiments.

FIG. 8 illustrates an end view of a ATF differential pressure transducer package in accordance with aspects of the embodiments. The view is from the outside looking directly into the attachment end 704. Four output pins 801 provide external circuits with access to the enclosed ATF differential pressure transducer. A port 802 allows a fluid to reach one side of the enclosed ATE differential pressure transducer. A different port 705 provides access to the other side. As such, the differential pressure of the two fluids can be measured.

Figure 9:
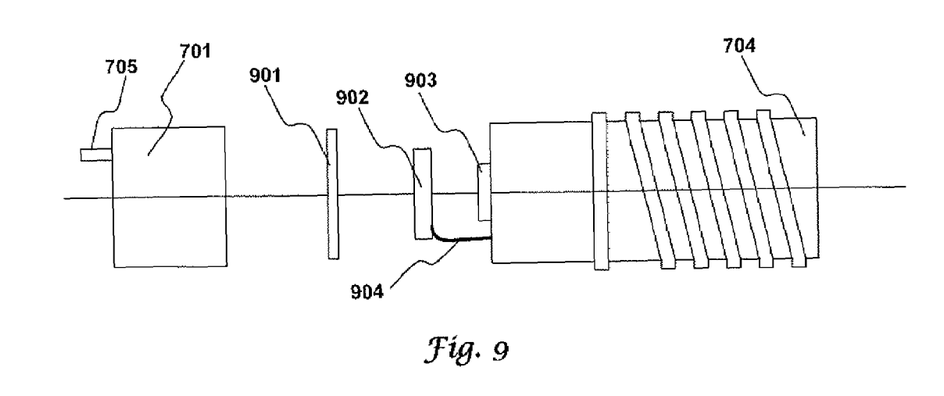
FIG. 9 illustrates an exploded view of a ATF differential pressure transducer package in accordance with aspects of the embodiments.

FIG. 9 illustrates an exploded view of a ATF differential pressure transducer package in accordance with aspects of the embodiments. The ATF differential pressure transducer 902 can be seen along with a wiring cable 904 that connects it to the pins 801. The ATF differential pressure transducer 902 can be attached to a port ring 903 through which port 802 passes. An O-ring 901 can help seal the cap end 701 to the attachment end 704.

Figure 10:
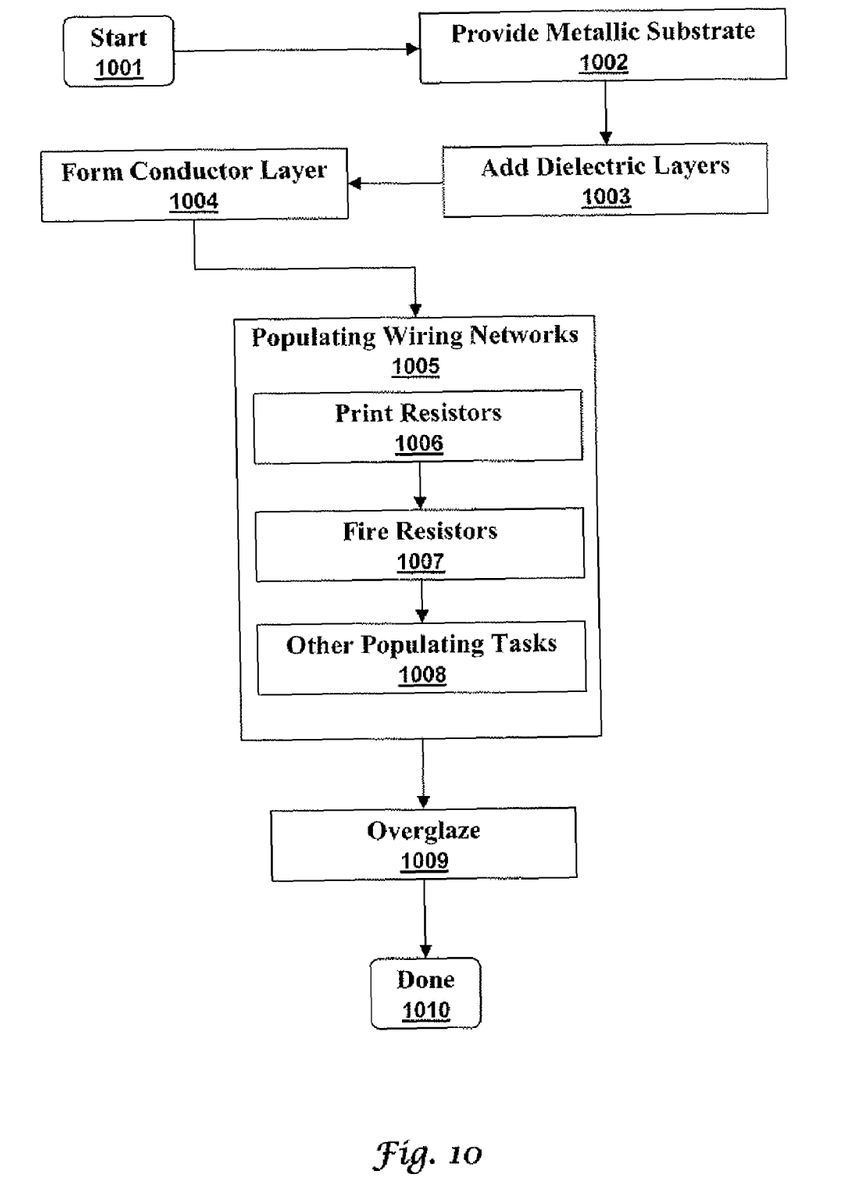
FIG. 10 illustrates a high level flow diagram of producing an ATF differential pressure transducer in accordance with aspects of the embodiments.

FIG. 10 illustrates a high level flow diagram of producing an ATF differential pressure transducer in accordance with aspects of the embodiments. After the start 1001 a metallic substrate is provided 1002 onto which dielectric layers are added 1003. The conductor layer is then formed 1004. The conductor layer can be formed by printing a conductive pattern, lithography, or in some other manner. Next, the wiring networks of the conductor layer are populated 1005. Populating the resistors can include the steps of printing the resistors 1006 onto the conductor layer and then firing to fix the resistors 1007. Those practiced in the art of printed circuitry are familiar with printing and firing resistors, conductors, and other circuit elements.

Other populating tasks 1008, such as attaching transistors or capacitors can also occur. The transistors and capacitors can be discreet circuit elements that can be used to filter or amplify the output of a transducer or sensing circuit. As discussed above, stress sensitive resistors arranged as a Wheatstone bridge are an excellent sensing circuit for detecting flexure and thence differential pressure. Overglazing 1009 provides a protective layer on top of the other layers before the process is done 1010.

Figure 11:
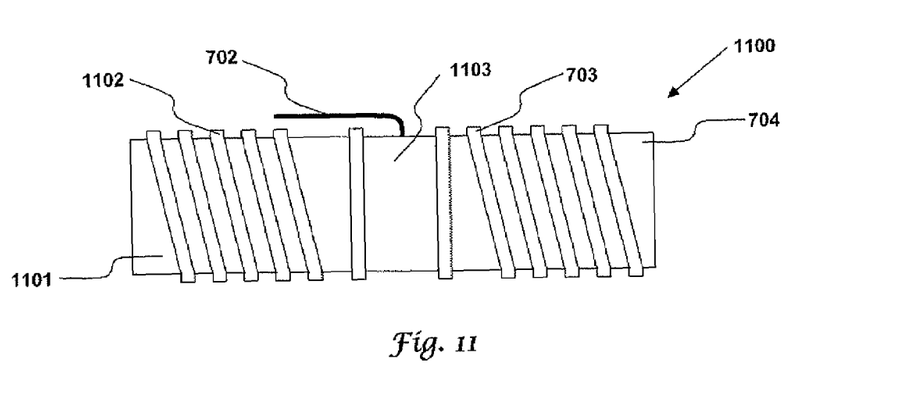
FIG. 11 illustrates a ATF differential pressure transducer package with a threaded end cap in accordance with aspects of the embodiments.

FIG. 11 illustrates a ATF differential pressure transducer package 1100 with a threaded end cap 1101 in accordance with aspects of the embodiments. A housing 1103 has a threaded cap end 1101 and an attachment end 704. The cap end 1101 has a port through which a fluid can reach an ATF differential pressure transducer inside the housing 1103. The attachment end 704 has threads 703 such that an attachment can be screwed onto the housing 1103. The cap end 1101 has threads 1102 such that the housing 1103 can be screwed into a fixture. A wiring cable 702 is shown exiting the housing 1103 between the threaded cap end 1101 and the attachment end 704. The wiring cable is a group of wires that can be attached to the bond pads. Many embodiments do not have the wiring cable 702 because, in those embodiments, external circuits access the ATF differential pressure transducer through pins in the attachment end 704.

Figure 12:
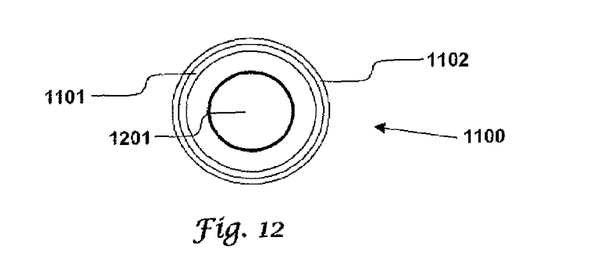
FIG. 12 illustrates an end view of a ATF differential pressure transducer package with a threaded end cap in accordance with aspects of the embodiments.

FIG. 12 illustrates an end view of a ATF differential pressure transducer package 1100 with a threaded end cap 1101 in accordance with aspects of the embodiments. The view is from the outside looking directly into the threaded cap end 1101. A port 1201 allows a fluid to reach one side of the enclosed ATF differential pressure transducer. A different port running through the attachment end provides access to the other side. As such, the differential pressure of the two fluids can be measured.

Figure 13:
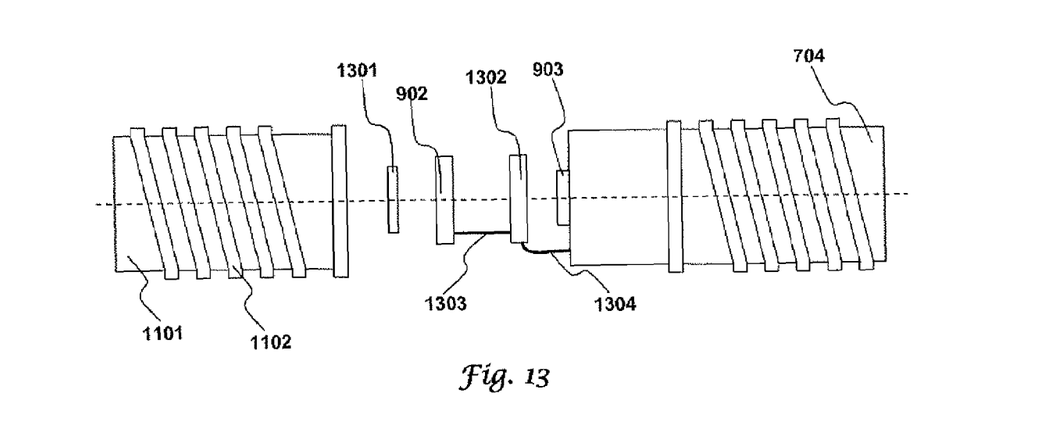
FIG. 13 illustrates an exploded view of a ATF differential pressure transducer package with a threaded end cap in accordance with aspects of the embodiments.

FIG. 13 illustrates an exploded view of a ATF differential pressure transducer package 1100 with a threaded end cap 1101 in accordance with aspects of the embodiments.

The ATF differential pressure transducer 902 can be seen along with a wiring cable 1303 that connects it to a conversion module 1302. The ATF differential pressure transducer 902 produces a sensor signal. The conversion module 1302 converts the sensor signal into an output signal. For example, the sensor signal can be a voltage between 0 volts and 1 volt. The output signal can be a voltage ranging between plus and minus 12 volts, an electrical current, a modulated sinusoid, or even a LVDS (low voltage differential signal). The conversion module allows a standard ATF differential pressure transducer 902 to be used in a standard housing while still customizing the package output to a customer's specifications. In FIG. 9, the sensor signal is routed directly to the pins 801. In FIG. 13, the sensor signal is routed to the conversion module 1302 where it is converted into an output signal. The output signal is then routed to the pins 801. The ATF differential pressure transducer 902 can be attached to a port ring 903 through which port 802 passes. An O-ring 1301 can help seal port 1201 to the ATF differential pressure transducer 902.

Figure 14:
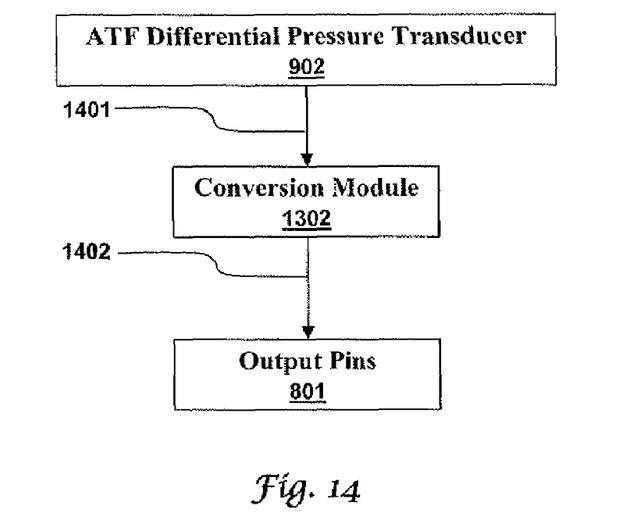
FIG. 14 illustrates the operation of the conversion module 1302 in accordance with aspects of certain embodiments.

FIG. 14 illustrates the operation of the conversion module 1302 in accordance with aspects of certain embodiments. The ATF differential pressure transducer 902 produces a sensor signal 1401 that the conversion module 1302 converts into an output signal 1402 that is then passed to the output pins 801.

Figure 15:
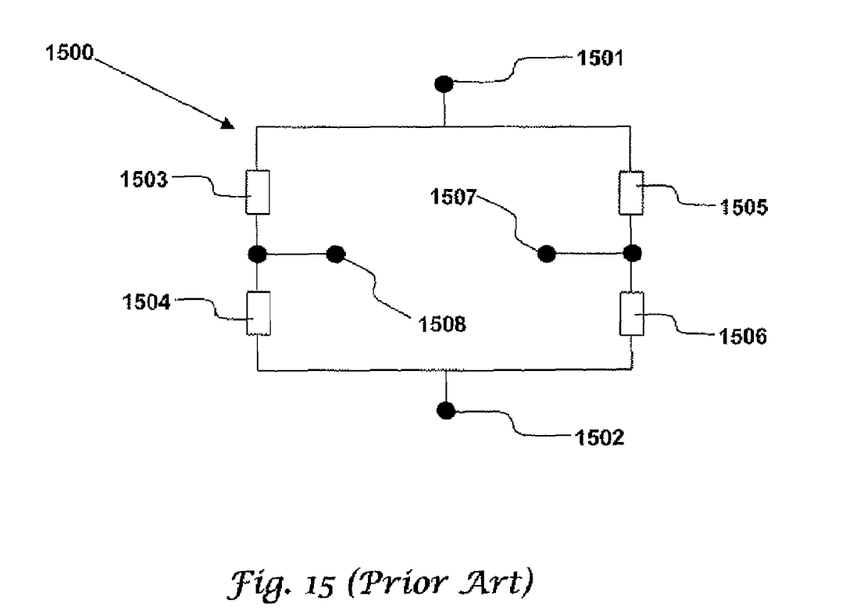
FIG. 15, labeled as prior art, illustrates a Wheatstone bridge in accordance with aspects of the embodiments.

FIG. 15, labeled as prior art, illustrates a Wheatstone bridge 1500 in accordance with aspects of the embodiments. A voltage can be provided across the power nodes 1501, 1502 and an output voltage can be measured across the output nodes 1507, 1508. A change in the resistance of one of the loads 1503, 1504, 1505, 1506 can be easily detected as a change in the output voltage. As discussed above, those practiced in the art of electrical circuitry are familiar with Wheatstone bridges.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:
   an advanced thick film stack overlying a metal substrate, wherein the metallic substrate comprises a flexible diaphragm, wherein the advanced thick film comprises at least one dielectric layer, at least one conductor layer, at least one component layer, and at least one overglaze layer;
   wherein the at least one dielectric layer is electrically insulating;
   wherein the conductor layer comprises a wire pattern comprising at least two wire networks;
   wherein the component layer comprises at least one resistor that resistively couples two of the at least two wire networks;
   wherein the conductor layer further comprises at least two bonding pads;
   wherein the overglaze layer is the top layer of the advanced thin film stack.

2. The system of claim 1 further comprising:
   at least one transistor electrically connected to the conductor layer; and
   at least one strain sensor electrically connected to the conductor layer;
   wherein the at least one strain sensor detects flexing of the metal diaphragm and produces an output correlated to the differential pressure across the metal diaphragm; and
   wherein the at least one transistor amplifies the output.

3. The system of claim 2 wherein a wheatstone bridge comprises the at least one strain sensor.

4. The system of claim 2:
   wherein the at least one strain sensor is at least two strain sensors;
   wherein a wheatstone bridge comprises the at least two strain sensors.

5. The system of claim 1 further comprising a thermistor electrically connected to the at least two wire networks.

6. A system comprising:
   a housing comprising two ports and enclosing an advanced thick film differential pressure transducer that measures the pressure differential between the two ports;
   wherein the advanced thick film pressure transducer comprises an advanced thick film stack overlying a metallic substrate wherein the metallic substrate comprises a flexible diaphragm, wherein the advanced thick film comprises at least one dielectric layer, at least one conductor layer, at least one component layer, and at least one overglaze layer;
   wherein the at least one dielectric layer is an electrical insulator;
   wherein the conductor layer comprises a wire pattern comprising at least two wire networks and at least two bonding pads;
   wherein the component layer comprises at least one resistor that resistively couples two of the at least two wire networks; and
   wherein the overglaze layer is the top layer of the advanced thin film stack.

7. The system of claim 6 wherein one of the two ports is sealed to produce a reference chamber and to establish a reference pressure.

8. The system of claim 7 further comprising a thermistor that senses a reference chamber fluid temperature.

9. The system of claim 6 further comprising at least one thermistor that senses at least one temperature within the housing.

10. The system of claim 9 further comprising:
    at least one transistor electrically connected to the conductor layer; and
    at least one strain sensor electrically connected to the conductor layer;
    wherein the at least one strain sensor detects flexing of the metal diaphragm and produces an output correlated to the differential pressure across the metal diaphragm; and
    wherein the at least one transistor amplifies the output.

11. The system of claim 10 wherein a wheatstone bridge comprises the at least one strain sensor.

12. The system of claim 10:
    wherein the at least one strain sensor is at least two strain sensors;
    wherein a wheatstone bridge comprises the at least two strain sensors.

13. The system of claim 6 further comprising:
    at least one transistor electrically connected to the conductor layer; and
    at least one strain sensor electrically connected to the conductor layer;
    wherein the at least one strain sensor detects flexing of the metal diaphragm and produces an output correlated to the differential pressure across the metal diaphragm; and
    wherein the at least one transistor amplifies the output.

14. The system of claim 10 wherein a wheatstone bridge comprises the at least one strain sensor.

15. The system of claim 10:
    wherein the at least one strain sensor is at least two strain sensors;
    wherein a wheatstone bridge comprises the at least two strain sensors.

16. The system of claim 6 further comprising a conversion module wherein the advanced thick film pressure transducer produces a sensor signal, wherein the conversion module converts the sensor signal into an output signal and wherein the housing comprises a threaded attachment end and a threaded end cap.

17. A method comprising:
providing a metallic substrate wherein metallic substrate comprises a flexible diaphragm;
depositing at least one dielectric layer onto the metallic substrate;
forming a conductor layer on the at least one dielectric layer wherein the conductor layer comprises a wire pattern comprising at least two wire networks and at least two bonding pads;
populating the at least two wiring networks with circuit components comprising at least one resistor; and
overglazing with an overglaze to form an ATF pressure transducer comprising the metallic substrate, the at least one dielectric layer, the conductive layer, the circuit components, and the overglaze.

18. The method of claim 17 wherein populating the at least two wiring networks comprises the steps of:
depositing a resistive layer; and
patterning the resistive layer to produce the at least one resistor.

19. The method of claim 17 further comprising:
fastening the ATF pressure transducer to a lower housing comprising a lower port;
connecting the at least two bonding pads to a wiring harness;
passing the wiring harness through an upper housing; and
attaching an upper housing to the lower housing to form a housing wherein the ATF pressure transducer is enclosed within the housing.

20. The method of claim 17 further comprising:
fastening the ATF pressure transducer to a lower housing comprising a lower port;
connecting the at least two bonding pads to a wiring harness;
passing the wiring harness through an upper housing; and
attaching an upper housing to the lower housing to form a housing wherein the ATF pressure transducer is enclosed within the housing;
wherein populating the at least two wiring networks comprises: depositing a resistive layer; and patterning the resistive layer to produce the at least one resistor.

* * * * *